UNITED STATES PATENT OFFICE.

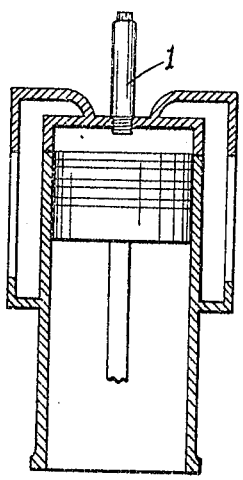
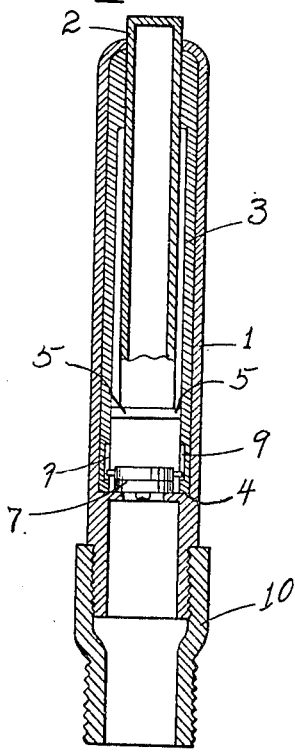
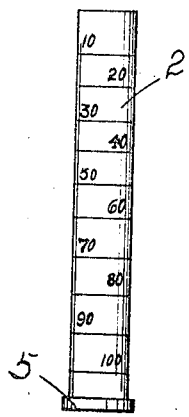
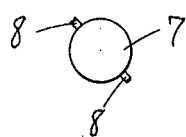
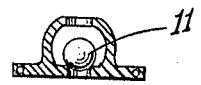

ACEY L. LAMBETH, OF MINERAL WELLS, TEXAS, ASSIGNOR TO G. H. HEDICK, SECRETARY, A. M. HEDICK, E. J. BEACH, AND MATT FARRER, ALL OF MINERAL WELLS, TEXAS.

COMPRESSION-INDICATOR.

1,286,033.  Specification of Letters Patent.  Patented Nov. 26, 1918.

Application filed May 14, 1917. Serial No. 168,438.

*To all whom it may concern:*

Be it known that I, ACEY L. LAMBETH, a citizen of the United States of America, residing at Mineral Wells, in the county of Palo Pinto and State of Texas, have invented certain new and useful Improvements in Compression-Indicators, of which the following is a specification.

My invention relates to a testing device for determining the compression of engine cylinders and particularly to indicators for explosive engine cylinders, and the object is to provide a simple and highly efficient device for quickly testing the compression in engine cylinders. Other objects and advantages will be fully explained in the following description and the invention will be more particularly pointed out in the claims.

Reference is had to the accompanying drawings which form a part of this application.

Figure 1 is a side elevation of the indicator, being shown inserted in place of a spark plug of an internal combustion engine for testing the compression. Fig. 2 is an enlarged vertical section of the casing and indicator plunger, showing a variation in the connecting means. Fig. 3 is a side elevation of the indicator plunger. Fig. 4 is a plan view of the back check valve. Fig. 5 is a vertical section of a ball valve casing or holder, showing a ball for closing the passage through the device, this form being a variation from the form shown in the previous views.

Similar characters of reference are used to indicate the same parts throughout the several views.

This invention includes a cylindrical hollow plug 1 which is to be inserted into some opening in the engine cylinder. The drawings show a section of a cylinder with the spark plug removed and the indicator put in the place of the plug. When this is done, the engine can be started so that the pressure can be tested by the explosive mixture rising in the indicator plunger 2. A tubular holder and guide 3 is mounted in the member 1 and rests on the annular shoulder 4, in casing 1. The opening through the outer end of the holder 3 is large enough for the movement of the plunger 2 but the holder fits the plunger snugly. The holder and guide 3 is cored out for a portion of the length thereof to provide for the movement of an annular bead 5 formed on the indicator. The bead 5 fits snugly in the cut out or enlarged interior part of the holder and guide 3. The end 6 of the casing 1 is forged or swaged to inclose the end of the holder 3 and to fit closely about the plunger 2 and thus to form a binding cap for the holder 3. A valve 7 is provided as a check valve and this valve rests on the annular seat 4 in casing 1. The valve 7 has lugs 8 which project into recesses 9 in casing or holder 3, the recesses being necessary for the movement of the valve to let the pressure fluid pass up within the plunger or indicator 2. The pressure fluid will lift the valve from its seat and pass upwardly between the valve and its holder. Additional connecting members 10 may be provided for making connections where a smaller or a larger opening than the threaded portion of casing 1 is found so that the member 10 can be screwed on the member 1 and then the member 10 screwed into opening of the engine to be tested.

A ball valve 11 may be used instead of the valve 7.

Numbers to indicate the pressure may be printed or stamped on the side of the plunger 2. Various changes in the sizes, proportions, and construction may be made in the indicator without departing from my invention.

What I claim, is,—

1. A pressure indicator comprising a cylindrical plug and housing having its inner end threaded and having an annular interior shoulder, a guide member mounted in said housing and supported on said shoulder, a valve in said guide member normally resting on said shoulder, said plug being swaged over the end of said guide member at the outer end and inclosing the guide member, and a plunger indicator mounted in said guide member and being adapted to move therein and project through the end of said plug and housing, said guide member having a stop to limit the movement of said plunger indicator.

2. A pressure indicator including a graduated plunger and a guide therefor and means for connecting the indicator to an engine cylinder consisting of a cylindrical hollow plug having its end threaded to be screwed into an engine cylinder, said hollow plug forming a binding cap engaging the outer end of said guide for inclosing and clamping the same in said plug.

In testimony whereof, I set my hand, this 24th day of April, 1917.

ACEY L. LAMBETH.